Nov. 27, 1934.  E. A. BRINER  1,982,284
PROPELLER CONTROL MECHANISM
Filed Aug. 27, 1932    4 Sheets-Sheet 4
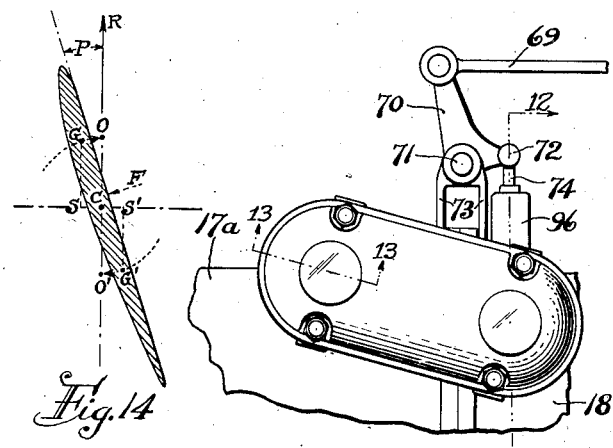
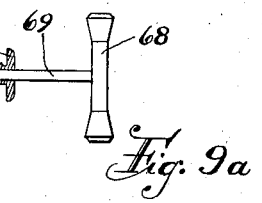
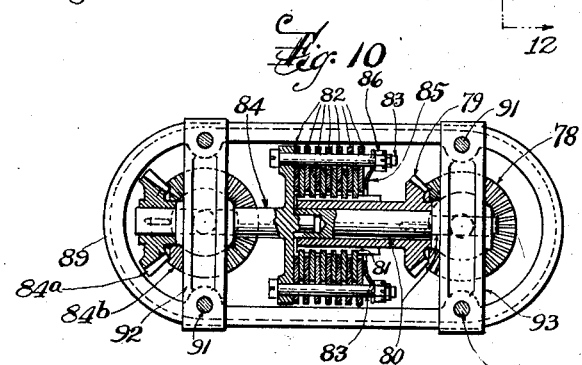
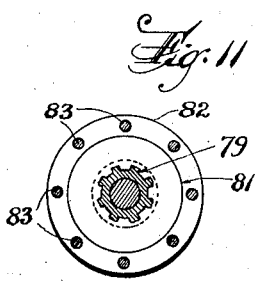
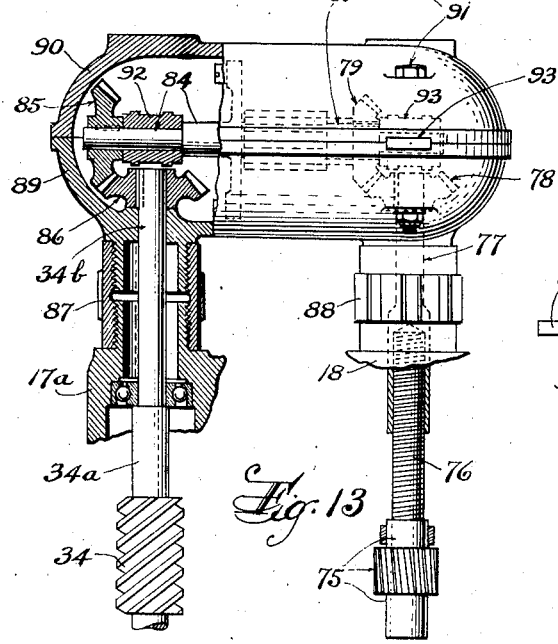
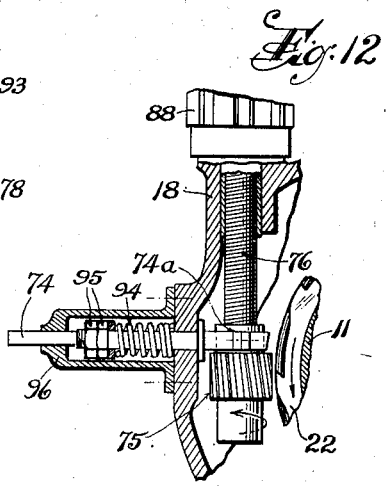
INVENTOR.
Emil A. Briner Patented Nov. 27, 1934

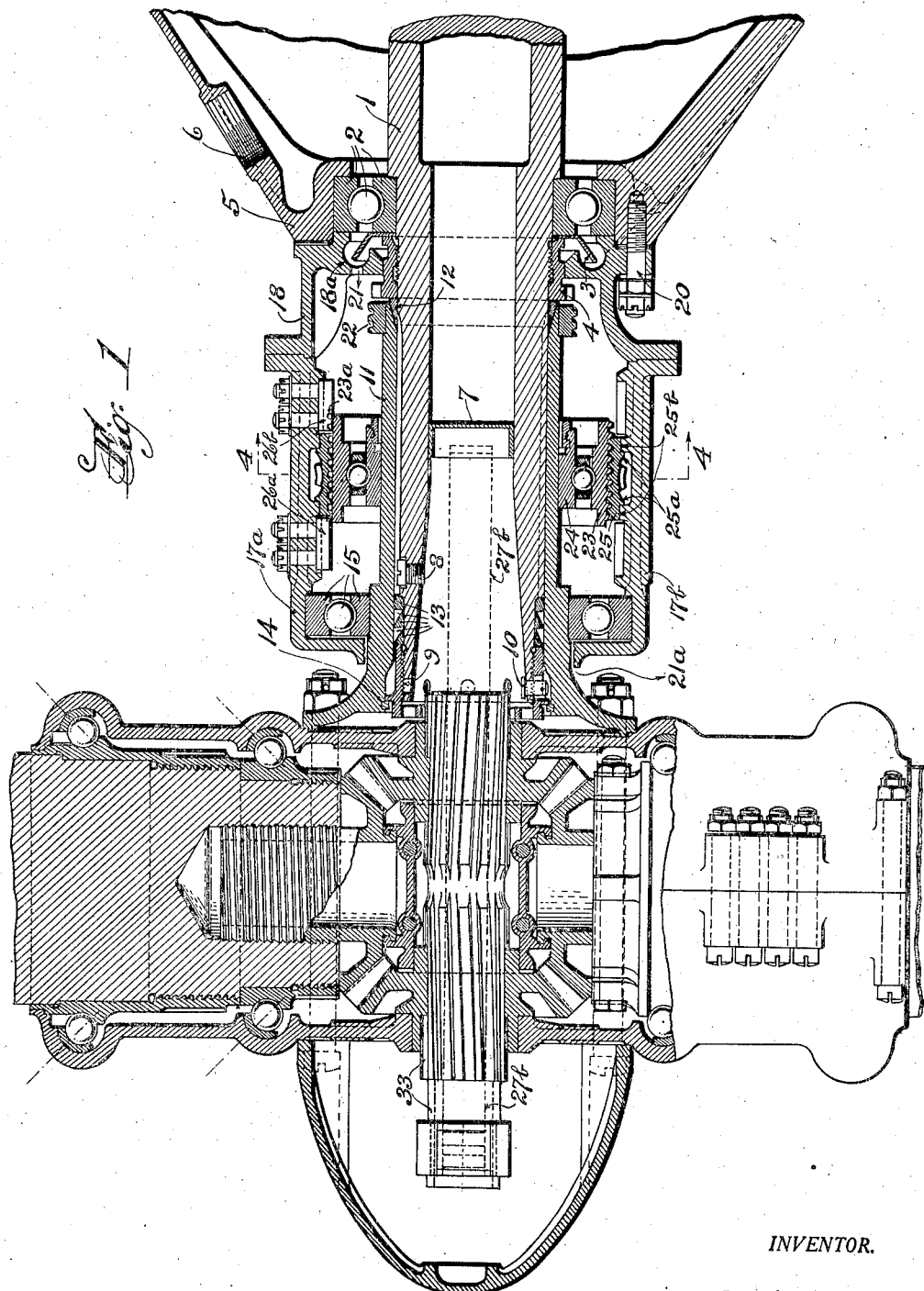

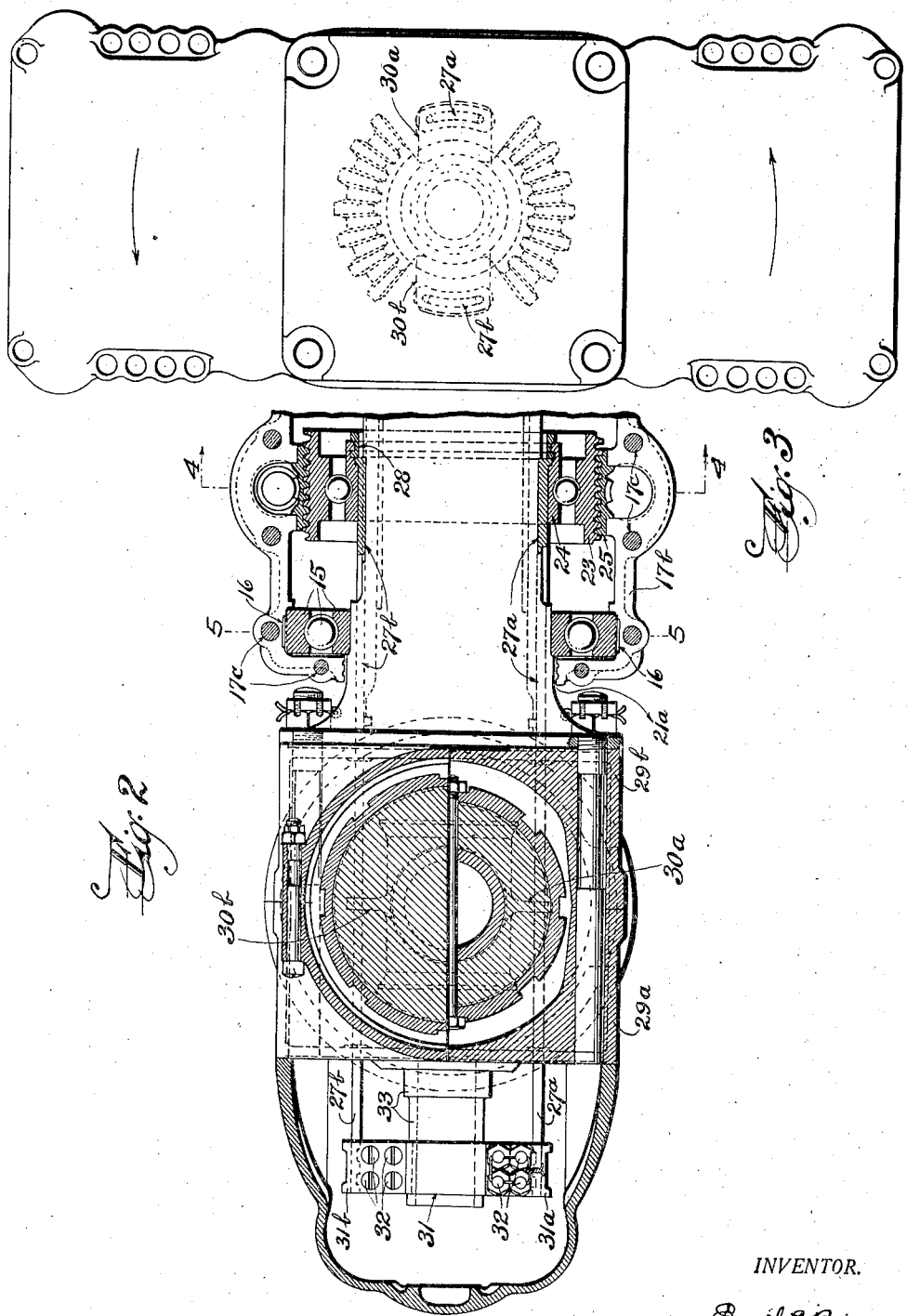

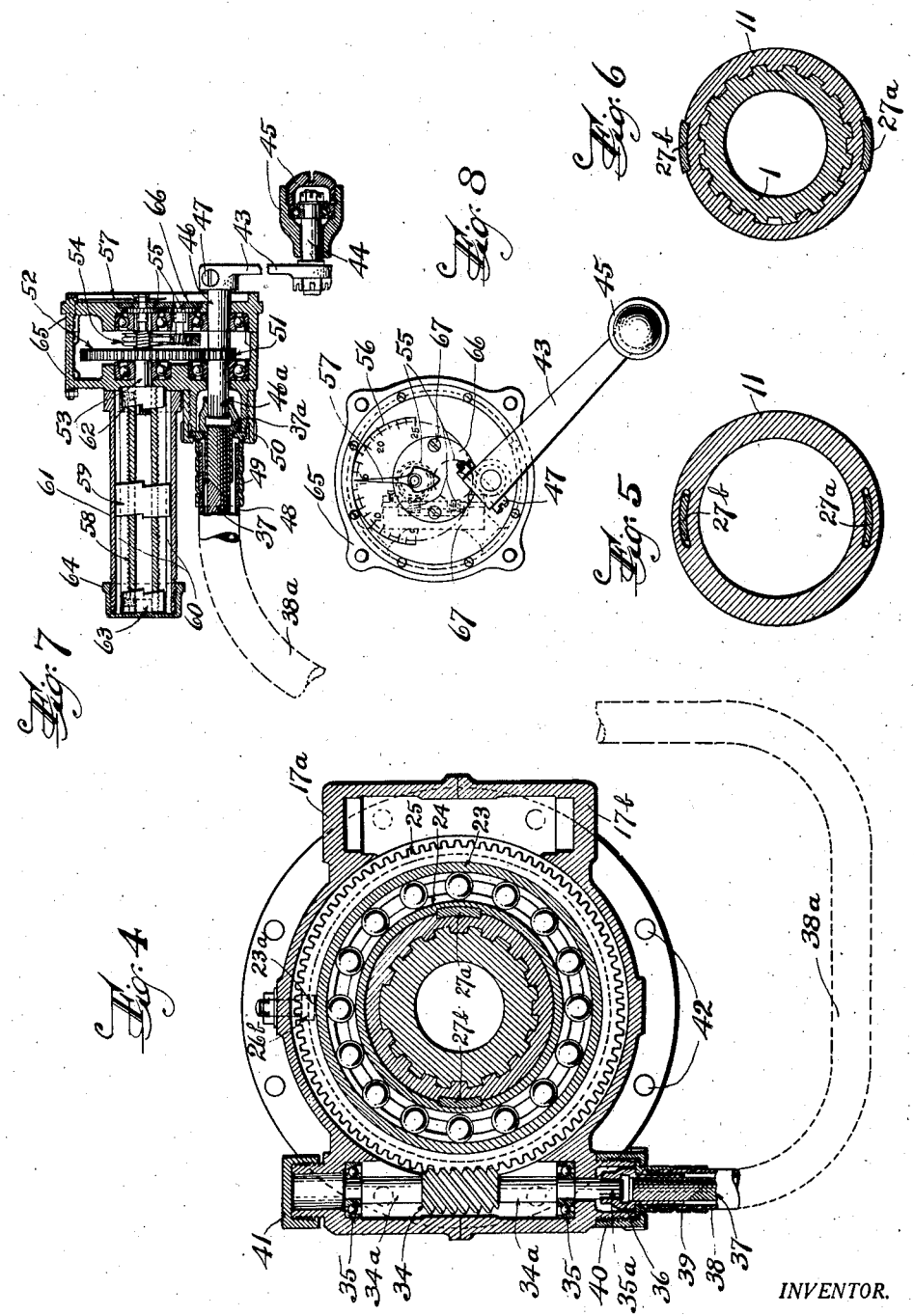

1,982,284

UNITED STATES PATENT OFFICE 1,982,284

PROPELLER CONTROL MECHANISM

Emil A. Briner, East Orange, N. J., assignor to Aero Engineering Corporation, East Orange, N. J.

Application August 27, 1932, Serial No. 630,612

18 Claims. (Cl. 170—163)

This invention relates to improvements in control mechanism of variable pitch propellers especially applicable to aircraft, and of the general type disclosed in my copending applications for Letters Patent Serial No. 358,387, filed April 26, 1929, and Serial No. 476,096, filed August 18, 1930.

This invention has for its principal object to provide an improved construction for eliminating the necessity of cutting a slot in the engine shaft as shown in my former constructions.

Another object is to eliminate the lever construction previously shown in connection with the intermediate gear housing, and yet insure an outboard supporting bearing and a completely enclosed hand control that will not creep irrespective of a wide pitch range, or engine vibration.

Another object is the elimination of all levers, cranks, pin bearings, small socket bearings, bell cranks, rack and gear constructions, or pin and link constructions, in the intermediate gear structure of a blade positioning mechanism. This elimination separates my disclosure from elements of trouble in the prior art.

Another object is to improve the lubrication in the intermediate gear enclosure, by drawing into it an oil mist from the engine crank case through anti-friction bearings to lubricate other anti-friction bearings.

Another object is to make the hand control apparatus more portable, more compact, and more adaptable to diverse aircraft structures as they may be found.

Another object is to provide the hand control with an auxiliary mechanism for quickly unlocking the blade positioning for reducing the pitch, and even going slightly into reverse pitch so as to act as an air brake, especially for shortening the landing run.

Another object is to combine the functions of hand crank, pitch-limit, pitch indicator, anti-friction bearings, flexible shaft connection, etc., in one compact instrument casing suitable for convenient location in a control cockpit.

Other objects, including desirable fundamental constructions will become apparent in the following detailed description.

The invention consists of the devices, combinations, and assembly of parts hereinafter described and claimed, including their ruggedness, compactness, and convenience.

An illustrative embodiment of the propeller control mechanism is shown in the accompanying drawings, in which:

Fig. 1 is in part a side elevation and in part a vertical longitudinal section of the pitch control structure, shown connected to my variable pitch propeller with parts broken away to show the relation of the internal mechanism thereof; Fig. 2 is a longitudinal section taken in a plane at right angles to the plane of Fig. 1; Fig. 3 shows the direction of rotation of the propeller and is an external view taken from the left of Fig. 1; Fig. 4 is a cross section at the intermediate gear taken on the line 4—4 as viewed from the left of Figs. 1 and 2, with certain parts shown in external view; Fig. 5 is a detail cross section of the engine shaft sleeve at the line 5—5, Fig. 2; Fig. 6 is a detail cross section of the engine shaft sleeve at the line 5—5 of Fig. 2; Fig. 7 is a longitudinal cross section of the hand crank pitch indicator mechanism with certain parts shown full or broken away; Fig. 8 is an outside view of the pitch indicator taken from the right of Fig. 7; Fig. 9 is an outside plan view of a small supplementary device for auxiliary pitch reducing, intended largely for emergency use and attached to the intermediate gear casing shown broken away. Fig. 9a is an emergency pull for location in control cockpit. Fig. 10 is a detail plan view of the same auxiliary device to a larger scale with top cover removed revealing parts in section and in full view; Fig. 11 shows a detail cross section of a slip coupling in Fig. 10; Fig. 12 shows a detail cross section of Fig. 9 at the line 12—12 drawn to a larger scale and viewed from the left with certain parts shown in full view; Fig. 13 is a part longitudinal section and part external view of the auxiliary pitch shifting device broken away from the intermediate gear casing. Figs. 1 to 9 are drawn to the same scale, whereas detail Figs. 10 to 13 are to a larger scale.

Fig. 14 is a diagram of a blade section showing blade twisting forces due to centrifugal force.

Similar characters of reference are employed in the above described views, to indicate corresponding parts.

Looking at Fig. 1, numeral 1 represents the end of a splined hollow driving shaft with its usual ball thrust bearing 2, oil slinger 3, and nut 4, all connected into the nose portion of a motor or engine housing 5, which engine housing usually has a tortuous atmospheric air passage, called a "breather" (not shown), screwed into the threaded hole 6. The oil plug 7, spline marker screw 8, shaft nut 9, and lock pin 10, are all standard shaft details. A splined shaft sleeve, 11, fits concentrically over the engine shaft centered by a conical split ring 12, at one end and a corresponding set of split rings 13, at the other end. All these rings are forced by the lock nut 9 to hold the splined shaft sleeve firmly and accurately in place. A split spring ring 14, is snapped into place over the shaft nut, and serves to help remove the sleeve, when shaft nut 9 is backed off.

Looking at Figs. 1 and 2, the inner race of ball bearing 15 fits tight on the shaft sleeve, whereas the outer race is preferably constrained by keys 16 at the joint of the upper and lower halves of the intermediate housing 17a and 17b. The halves of the intermediate housing are held together by through bolts 17c, shown in Fig. 2.

In Fig. 1, adapter 18, is shown fastened to the engine housing by a series of studs, of which one is shown, 20. This adapter includes the splash groove 18a of the ball bearing slinger, and a flange with bolts for connection to the halves of the intermediate casing. The adapter shows one hole 21 of a series for receiving oil mist from the engine housing through thrust bearing 2; the flow being augmented by an outflow 21a, due to an external suction acting upon the clearance between shaft sleeve and casing. Within the adapter is shown a right hand stub tooth spiral gear 22, having a force fit on the end of shaft sleeve 11. Said spiral gear is of ring form and normally out of engagement with any other gear, as will be shown later.

In Figs. 1, 2, and 4, a deep groove ball bearing has an outer race 23, and an inner race 24. The outer race has a single pitch right hand thread cut into its circumference to fit the inside of worm wheel ring gear 25. Said ring gear has thrust bearing shoulders 25a, and plain bearings 25b. A keyway 23a is cut in the thread portion of the outer race 23, longitudinally across the thread, thus permitting the thread to pass the two stationary guides 26a and 26b, said guides forming an interrupted stationary spline having bolt extensions with nuts holding them to the intermediate housing in Figs. 1 and 4. The inner race 24 is made to slide axially along the shaft sleeve 11, and is keyed with two long thin sliding keys, 27a and 27b, which turn with it. These thin sliding keys are important elements of the invention. I term them skeleton keys to designate their character. They take no part as strength members in transmitting engine power to the propeller. These keys are shown in Figs. 1 to 6.

These skeleton keys are really elements of a reduction gear transmission between the slidable ball bearing element (23, 24) and the blade positioning mechanism. When this propeller is in operation, said reduction gear transmission reduces the thrust load on said ball bearing element in a ratio of about 10 to 1, compared with prior art methods of taking a tremendous direct thrust, due to blade twist, on said sliding ball bearing element. The importance of this can only be judged from the fact that a heavy load on the sliding ball bearing element makes it impractical for continuous operation at actual motor speeds approximating 2000 revolutions per minute and over. Heavy load and high speed is incongruous.

In Fig. 2, such keys are keyed and fastened into the inner ball race 24 by means of spring ring 28, whence they slide through the shaft sleeve, through the propeller hub casings 29a and 29b, through grease box extension 30a and 30b, and finally have their grooved ends embedded in the outer end of cross head 31 by means of U shaped straps 31a and 31b, and bolts 32. The crosshead 31 is preferably made in halves and clamped by bolts 32 in a groove of the herring bone spline shaft 33, which imparts pitch setting to the propeller blades in accordance with copending patent applications previously mentioned and therefore needing no description here. The thin skeleton keys in sliding through the various elements mentioned, receive lateral guiding support from them.

Fig. 3 shows how the skeleton keys clear the bevel gears when the latter are in their mid-position. It also shows arrows indicating the direction of rotation of the propeller illustrated in the other figures.

In Fig. 4, a cross section of the intermediate gear housing shows a multiple pitch worm wheel 34, preferably integral with its shaft 34a, mounted in ball bearings 35, and having a sliding splined end 35a, inserted in flexible shaft end 36, of flexible shaft 37, with a casing 38, secured in flange coupling 39 and gripped by nut 40. This worm wheel has a screw cap 41 for lubrication, when hand control alone is used. Otherwise the cap is removed and the auxiliary pitch reducing mechanism is screwed on in its place as explained later. An imaginary broken outline 38a, of the flexible shaft casing 38, is shown carried over toward Fig. 7, where its interrupted outline connects with a hand crank mechanism. It is evident that this worm and wheel arrangement with its flexible shaft connection, can be swung around to eight positions at registering flange bolts 42, thus having universal adaptability to single engine, or multi-motored aircraft, or to multiple propellers while using identical intermediate gear.

The hand crank assembly shown in Figs. 7 and 8, is preferably located in the control cockpit. Hand crank 43, has a crank pin 44, with ball bearing handle 45, and is attached to a tiny crank shaft 46, with locking bolt 47. The tiny shaft 46, has a sliding splined end 46a, fitting into a flexible shaft end 37a, of flexible shaft 37, with a casing 48, secured in flange coupling 49 and held by nut 50.

The hand crank shaft is provided with a pinion 51, meshing with a larger gear 52, on shaft 53, which also carries a worm 54, meshing with a train of reduction gearing 55, for indicating the pitch of the blades on scale 56, with pointer 57.

Shaft 53 is splined at its left end to receive a hollow threaded member 58, shown in section. This threaded member is fitted on the outside with a double-jawed traveling nut 59, running on guides 60, of tubular element 61. Threaded member 58 carries at either end jaw clutch nuts 62 and 63, fastened to revolve with it. These jaw clutch nuts engage jaw clutches on the traveling nut at either end of its range of travel, as predetermined by the pitch range desired in the propeller blades. The tubular element is capped at 64, and fastened to the indicator case 65, which has ball bearings for mounting the two principal shafts 46 and 53. The object of pinion 51 and gear 52 is to reduce the size of the traveling nut mechanism in about a four to one ratio, thus making same compact and saving weight. A round inset cover plate 66, with screws 67, completes the indicator case. The train of reduction gearing 55 to the pointer, is supported by a small structural member 67 fastened to the indicator case.

When the hand crank 43 is turned in either direction, it turns flexible shaft 37, going to worm 34, revolving gear wheel 25, and indicates the position of the blades on scale 56, which in this illustration shows plus pitch angles of five to twenty-five degrees; but the range might be a wide range, for example minus ten to plus thirty degrees. The pitch range is dependent upon the size of the spiral angles of herring bone splines in the propeller blade casing.

The diagram in Fig. 14, is a typical section of a propeller blade taken at right angles to the blade axis at three-fourths of the radial distance out from the center toward the tip of the blade. The dot C indicates the blade axis and also the center of gravity of the section, the dot G the center of gravity of the leading portion of the section, and the dot G' the center of gravity of the trailing portion. The line SS' represents the axis of the engine shaft below it, while the arrow OR shows the direction the blade turns about the shaft axis. The angle P is a positive pitch angle.

Assuming that this elemental section of blade is of metal, and has a small thickness to give it weight; it will be observed, in the leading portion, that the dotted line SG (rising diagonally upward from the shaft axis) is really shorter than the diagonal line measured from a point on the shaft axis below C to the point O, into which the point G may swing going from G to O. When swivelly mounted in ball bearings and acted upon by centrifugal force, the weight of the leading portion of blade section concentrated at G moves toward O, because O is further from the shaft axis SS' than G and the action of centrifugal force tends to throw said center of gravity of the leading portion as far as possible from the shaft axis SS'. Likewise the center of gravity G' of the trailing portion, moves from G' to O'. These two forces cause a twisting moment around the blade axis represented in magnitude by the path of two dotted arrows GO and G'O', which tend to twist the blade into a position of lessening pitch, or even zero pitch.

These sectional twisting moments, when integrated to cover all sections of a propeller's blades, are of considerable magnitude. In a certain two-bladed metal propeller, nine feet in diameter, they amounted to thousands of inch pounds, and had the effect (when lessening the pitch by hand control) of reducing one's efforts to a mere follow up motion. The greater the pitch angle up to 35 or 40 degrees, the easier it is to lessen the pitch. It is somewhat like starting to pull a weight down an inclined plane—steeper at the top. The steeper the incline, the easier it is to start and follow up the motion. To increase the pitch has the opposite effect. The above mentioned twisting moment is the important impetus utilized herein for quickly lessening the pitch setting of propellers.

In the same diagram, is shown a relatively small force F, representing the center of the air forces on this section. Its concentration varies along the chord, depending upon the position of the pitch angle. Its twisting moment about the blade axis is relatively of minor importance in blades having normal airfoil forms as typified in Fig. 14. Often the air force F opposes the centrifugal twisting moment, and sometimes helps the twisting moment. The important fact is that experimental observation has proven that in the type of propeller illustrated, especially of the reversible type, there is practically no hand power required to reduce the pitch from plus twenty-five degrees to zero, being particularly easy in starting the motion; while going in the other direction the power is considerable and out of all proportion to lessening the pitch, especially at large pitch angles like twenty-five degrees. This makes power driving for increasing the pitch uneven and rather impracticable. There are objections to counterbalancing. My method prefers increasing the pitch by hand.

When a blade goes into negative pitch angles, the centrifugal force acting on the blade tends to twisting the blade about its longitudinal axis back into its no pitch position (or near it, depending somewhat upon the particular form of the blade airfoil). In other words, the centrifugal force has the same action on blades in negative pitch position as on those in positive pitch, namely to twist the blade into its no pitch position.

Figs. 9 and 9a show the relationship in plan view of the auxiliary shifting device to the intermediate gear casing, using the same scale as the preceding figures. A T shaped emergency handle 68 is attached to a control wire 69 sliding through an instrument board ferrule 69a, and continuing to a bell crank 70 with fulcrum pin 71 and push knob 72. The fulcrum pin is carried by double bracket 73, attached to the double flange of the intermediate gear housing. The knob 72 touches spring eyebolt 74, better shown in Fig. 12, which is an enlarged detail section taken at 12—12 in Fig. 9. This spring eyebolt has a connecting rod end 74a, forming a bearing for a projection of hollow flexible shaft gear 75 of flexible shaft 76. The flexible shaft gear with its projections serve to form the hollow end for securing the flexible shaft 76. The upper end of said flexible shaft connects with shaft 77 and bevel gear 78 (in Fig. 13), which in turn meshes with bevel gear 79 keyed to shaft 80 shown also in Fig. 10.

In Figs. 10, 11 and 12, gear 79 has a projection, which is splined on the outside to receive six steel friction discs 81 (Figs. 10 and 11) which are shown in contact with seven, preferably bronze, discs 82, wherein these outer discs are pierced to slide on registering clamp bolts 83. In Fig. 10 these clamping bolts engage the flange of shaft 84 at their head ends, while at their nut ends they engage a spring disc 84a, which is adjustable by the clamp bolts mentioned to preload this slip coupling by means of the nuts 84b. This coupling does not slip, up to a certain predetermined torque. It slips when overloaded beyond this torque. An important feature is that auxiliary shifting device is continuously air cooled to insure proper temperature conditions at the slip coupling.

In Figs. 10 and 13, a small bevel gear 85 is keyed to the end of shaft 84, and meshes with bevel gear 86, keyed to shaft 34b which is an extension of shaft 34a of the hand shift mechanism shown in Fig. 4. This shaft extension 34b is only made when the auxiliary pitch shift mechanism is added to the hand shift mechanism.

The attachment of said auxiliary mechanism requires removing screw cap 41, shown in the upper left corner of Fig. 4, and substituting fluted nut coupling 87 in Fig. 13. An identical screw cap, not shown, may be removed from the adapter 18 and replaced by an identical fluted nut coupling 88, in Figs. 12 and 13.

These fluted nut couplings, with right and left hand threads, connect the intermediate gear housing with its adapter, to the auxiliary pitch shift housing 89 with cover 90, held by registering bolts 91, which also pass through the ends of the beamlike shaft bearings 92 and 93, carried across the housings.

In Fig. 12, the short flexible steel shaft 76 is preferably spring tempered so that it maintains its shape and keeps spiral gear 75 out from contact with spiral gear 22 on the engine shaft sleeve. However, to make this doubly sure, a compression spring 94, with adjusting nuts 95, is placed on the eyebolt 74, having a guide 96 fastened to adapter 18.

In brief, the auxiliary pitch shifting mechanism is an attachment to the intermediate gear housing with its hand control, primarily for instantly lessening the pitch, or even reversing it in coming to a quick stop—an air brake.

In coming to a landing, the engine is always throttled, so there is no danger of over revolutions in passing the blades into the so-called "no pitch position". In reality the blades always have pitch to absorb considerable engine power, because propeller blades never have a flat, but a twisted, form.

It is desirable to use hand control with its slower operation whenever possible. In shifting the pitch by hand the pilot comes in intimate touch with his variable pitch mechanism out to the very tips of the blades. The feeling of absolute smoothness in pitch shifting assures him of the perfection of the whole propeller structure and its operation. Such feeling extends even to an inspection of smoothness in engine operation, since the hand control is in touch with the crankshaft too. Any difference in propeller operation is thereby easily detected in the hand control.

Advantages can be brought out by the following description of operation:

The pitch of the blades may be adjusted while the propeller is in flight, to any position suitable for take-off, climb, high speed, economy, etc., by turning the hand crank in the control cockpit to the right or to the left. Turning right hand increases the pitch to a certain point, turning left hand decreases it to a limit. That is all there is to the hand control.

It is exceptional that ball bearings have been used throughout. Note the five ball bearings in Fig. 7 and the three ball bearings in Fig. 4. Trouble with such hand controls, heretofore, has been "creep". Ball bearings would ordinarily make such "creep" worse. The pitch of the blades would gradually lessen, ever so little, in the presence of vibration; therefore friction was previously considered desirable to lessen this "creep". Nevertheless in the mechanism described, anti-friction bearings are used to reduce the hand power required to increase the pitch. They are also used to transmit power from the blades back to the pitchlock when the pitch is lessened. The handcrank movement, when lessening the pitch, merely serves to keep the pitch shifting mechanism continuously unlocked. The pitch is locked by the "Acme" screw thread of the worm wheel engaging a thread on the outer race 23 of the ball bearing, whose inner race 24 holds the skeleton keys. When the propeller is in operation said keys are always in tension, due to blade twist previously mentioned. "Acme" threads increase the locking effect over square threads and center the outer race. These "Acme" threads have a single pitch angle of less than one degree. Such angle is pitchlocking even in the presence of oil and engine vibration. Any pull in the skeleton keys due to blade twist appears as an axial thrust on the large "Acme" thread screw, giving a friction pitchlock to the propeller blades. Such thread must have a large diameter and a small lead.

When the auxiliary pitch shift attachment with its tiny transmission is added, it merely idles if the hand gear is used. The attachment serves no useful purpose, whatever, when the pitch mechanism is operated by the hand crank. When, for example, an airplane's wheels touch the ground, another handle 68 in Fig. 9a may be pulled, whereupon the bell crank 70 pushes against the eyebolt 74 (Figs. 9 and 12), compresses spring 94 and instantly causes spiral gear 75 to engage spiral gear 22 on the motor shaft sleeve. This causes the auxiliary shift transmission to turn as indicated by arrows in Fig. 12, as fast as the motor shaft turns. If said shaft turns 1000 revolutions per minute, the auxiliary transmission turns about 1000. Any other suitable ratio may be used. Said transmission causes shaft 34a and its worm wheel 34 to unlock the pitch shift mechanism at the "Acme" thread, while the twisting moment of the blades moves them toward no pitch. Meanwhile, the long flexible shaft 37 receives engine shaft power to register the movement on the pitch indicator. The blade power stops at the "Acme" thread (see Fig. 2). Should the operator hold the emergency pull too long, the preloaded slip coupling acts to drop the engine shaft load, when a reversing propeller gets into negative pitch, or traveling nut 59 (Fig. 7) reaches the low pitch limit. It therefore becomes possible for a pilot to pull the emergency stop handle 68 when his wheels touch the ground, thus using the auxiliary device as an air brake with definite effect. Turning to Fig. 12, spiral gears 22 and 75 mesh easily at high revolutions assisted by the "take up" in the short bit of flexible shaft.

Having set forth the character of the invention, I claim the following:

1. A compact hand control mechanism for a variable pitch propeller comprising, a ball-bearing crankshaft having at one end a crank with handle, and at the other a flexible shaft coupling, a pair of reduction gears connecting said crankshaft with a ball-bearing countershaft in engagement with a threaded member carrying a double jawed traveling nut, engageable with complementary jaws on travel limiting nuts; all enclosed in a convenient mounting case.

2. A compact hand control mechanism for a variable pitch propeller comprising, a ball-bearing crankshaft having at one end a crank with handle, and at the other a flexible shaft coupling, a pair of reduction gears connecting said crankshaft with a ball-bearing countershaft in engagement with a threaded member carrying a double jawed traveling nut, engageable with complementary jaws on travel limiting nuts; a further reduction gear train connected with a pointer on a pitch indicating dial, all mounted in a convenient case.

3. In apparatus of the class described, a supplementary pitch shift device comprising, in part, a pair of spiral gears of which the larger has connection with a motor shaft, and the smaller has flexible connection with an idling transmission means connected with a hand pitch control, said spiral gears being normally constrained out of engagement; means for bringing said gears into engagement, whereby the hand pitch control may be instantly unlocked and the propeller pitch more quickly reduced.

4. In control mechanism of a variable pitch propeller, a supplementary pitch shift device comprising in part, a pair of spiral gears of which the larger has connection with a motor shaft, and the smaller has connection with an idling transmission means including a slip coupling connected with a hand pitch control having a low pitch limit stop, said spiral gears being normally constrained out of engagement; means for bringing said gears into engagement: whereby the hand pitch control may be unlocked, and the propeller pitch more quickly reduced to the point of low pitch limit.

5. In control mechanism of a reversible pitch propeller, a supplementary pitch shift device comprising in part, a pair of spiral gears of which the larger has rigid connection with a motor shaft, and the smaller has connection with an idling transmission means, including a slip coupling connected with a hand pitch control; said spiral gears being normally constrained out of engagement; means for bringing said gears into engagement: whereby the control mechanism may be unlocked, and the propeller pitch more quickly reduced until centrifugal forces due to increasing negative pitch angles cause the auxiliary mechanism to slip at the slip coupling.

6. In control mechanism of a reversible pitch propeller, a supplementary pitch shift device comprising in part, a pair of spiral gears of which the larger has connection with a motor shaft, and the smaller has connection with an idling transmission means including a slip coupling connected with a hand pitch control having a pitch limiting stop at a low negative pitch, said spiral gears being normally constrained from engagement; means for bringing said gears into engagement: whereby the pitch mechanism may be unlocked and the propeller pitch quickly reduced to the pitch limiting stop.

7. A propeller shaft sleeve flanged at one end, and having holes for connection with bolts in a hub casing of a variable pitch propeller, spline means, cone rings, and a nut for attachment of said sleeve to a motor shaft, keyways and key holes in said shaft sleeve parallel to the shaft axis for slidable skeleton keys of a pitch shift mechanism.

8. A propeller shaft sleeve flanged at one end, and having holes for connection with bolts in a hub casing of a variable pitch propeller, spline means, cone rings, and a nut for attachment of said sleeve to a motor shaft, keyways and keyholes therein parallel to the shaft axis for slidable skeleton keys of a pitch shift mechanism, and a spiral gear attached to the other end of the shaft sleeve for engagement with a supplementary pitch shift mechanism.

9. In apparatus of the class described, a plurality of blades, each pivoted to permit change of pitch, manually operable means to change the pitch thereof; with supplemental means including shaft transmission and gears normally out of engagement with a motor shaft gear, manual means to bring these two means into engagement: whereby the former may be made to act more quickly.

10. In propeller control mechanism, a pitch shift unit within an intermediate housing, comprising a worm with worm wheel ring gear concentric to a motor shaft, pitchlock threads inside of said worm wheel ring gear, complementary threads with keyway on an axially slidable ball bearing concentric to said shaft, an interrupted stationary spline adjacent said ring gear and slidable in said keyway; reduction transmission means between said slidable ball bearing and a blade control mechanism, and means for control connected with said worm.

11. In propeller control mechanism, an intermediate pitch shift unit within a supporting housing, comprising a worm with worm wheel ring gear concentric to a motor shaft, pitchlock threads inside of said worm wheel ring gear, complementary threads with keyway on an axially slidable ball bearing concentric to said shaft, an interrupted stationary spline adjacent said ring gear and slidable in said keyway; hand control transmission means at one end of said worm shaft, and quick actuation transmission means at its other end including a spiral gear engageable with one on a coupling sleeve of said motor shaft.

12. In propeller control mechanism for aircraft, a manual transmission means for increasing the pitch of the blades of a propeller, complementary quick return means for decreasing said pitch, both transmission means comprising a worm in constant engagement with a threaded worm wheel ring gear in threadlocked engagement with a pitch shift transmission; said complementary transmission including a pair of spiral gears normally out of engagement, one of which is rigidly attached to a coupling sleeve of a power shaft and the other is engageable therewith from a place of operation.

13. In propeller control mechanism for aircraft, a manual transmission means for increasing the pitch of blades of a propeller, complementary means for quick reversal of pitch operable as an air brake, said manual transmission including a worm in constant engagement with a threaded worm wheel ring gear in threadlocked engagement with a pitch shift transmission; said complementary transmission including a pair of spiral gears normally out of engagement, one of which is rigidly attached to a power shaft coupling and the other is engageable at will from a place of operation.

14. In propeller control mechanism for aircraft, a manually operable transmission means for increasing the pitch of a plurality of blades, while propeller is in operation, a complementary operable quick transmission means for decreasing their pitch; a common positive pitchlock in these two transmission means: and a common means for limiting and indicating said pitch.

15. A flanged propeller shaft sleeve, coupled at one end to a propeller hub casing, cone rings and a nut fastening said sleeve on a shaft of a motor, an intermediate ball bearing housing attached to the housing of said motor, a concentric internally threaded worm ring gear element rotatably mounted within said intermediate housing, an axially slidable externally threaded ball bearing element of a blade pitch operation mechanism within said ring gear; so constructed and arranged that said threaded elements serve to pitchlock the mechanism of said blade pitch in any position.

16. A ball bearing intermediate housing rigidly attached to an adjacent engine housing, oil mist in said engine housing, a coupling sleeve of a variable pitch propeller attached to said engine shaft, a second ball bearing element of a pitch shift mechanism within said intermediate housing, a third ball bearing in the adjacent engine housing, partial open construction of said intermediate housing at both ends; so constructed and arranged as to induce a continuous flow of oil mist from said engine housing through all ball bearing elements mentioned, when engine is in operation.

17. In blade actuation mechanism of a variable pitch propeller, a plurality of blades, a plurality of skeleton key elements connected at one end to a crosshead of a herring bone spline gear reduction transmission operable with said blades, and connected at the other end with a ball bearing crosshead axially slidable upon a power shaft sleeve, and a threaded ring gear; so constructed and arranged as to threadlock the blade operation mechanism at any point within the range of motion.

18. In blade operation mechanism of a variable pitch propeller, an internally threaded worm wheel ring gear concentrically rotatable within an intermediate housing surrounding a motor shaft coupling sleeve, a corresponding externally threaded ball bearing slidable on said shaft sleeve, but constrained axially thereof by said threaded members, skeleton key elements connecting said ball bearing and a blade mechanism; so constructed and arranged that the blade mechanism self-locks when left in any position.

EMIL A. BRINER.